United States Patent

[11] 3,588,238

| [72] | Inventor | Tokusaburo Kakiuchi<br>Tokyo, Japan |
|---|---|---|
| [21] | Appl. No. | 764,510 |
| [22] | Filed | Oct. 2, 1968 |
| [45] | Patented | June 28, 1971 |
| [73] | Assignee | Kabushiki Kaisha Ricoh<br>Tokyo, Japan |
| [32] | Priority | Oct. 17, 1967 |
| [33] | | Japan |
| [31] | | 42/66736 |

[54] AUTOMATIC FILM LOOP FORMING DEVICE FOR USE IN MINIATURE MOVIE PROJECTOR
9 Claims, 3 Drawing Figs.

| [52] | U.S. Cl. | 352/159 |
|---|---|---|
| [51] | Int. Cl. | G03b 1/58 |
| [50] | Field of Search | 352/159 |

[56] References Cited
UNITED STATES PATENTS

| 1,551,037 | 8/1925 | Lube | 352/159 |
|---|---|---|---|
| 2,494,842 | 1/1950 | Thevenaz | 352/159 |
| 3,089,629 | 5/1963 | Sakaki | 352/159X |
| 3,134,294 | 5/1964 | Kaden et al. | 352/159 |

*Primary Examiner*—Louis R. Prince
*Assistant Examiner*—Joseph W. Roskos
*Attorney*—Burgess, Ryan and Hicks ABSTRACT: A sprocket placed between a projection aperture and a takeup reel advances film to the takeup reel. The sprocket is driven by a gear train connected to a rotating shutter shaft. A spring-loaded lost motion device permits the sprocket to remain motionless during the initial operation of a pulldown claw at the projection aperture, so that a loop of film forms between the projection aperture and the sprocket. The sprocket then rotates and feeds the film.

PATENTED JUN28 1971 3,588,238
FIG. 1
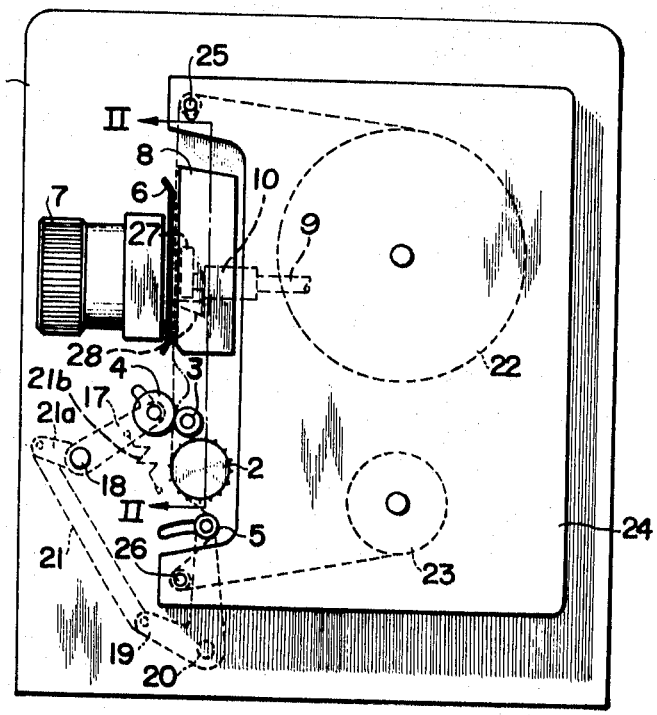
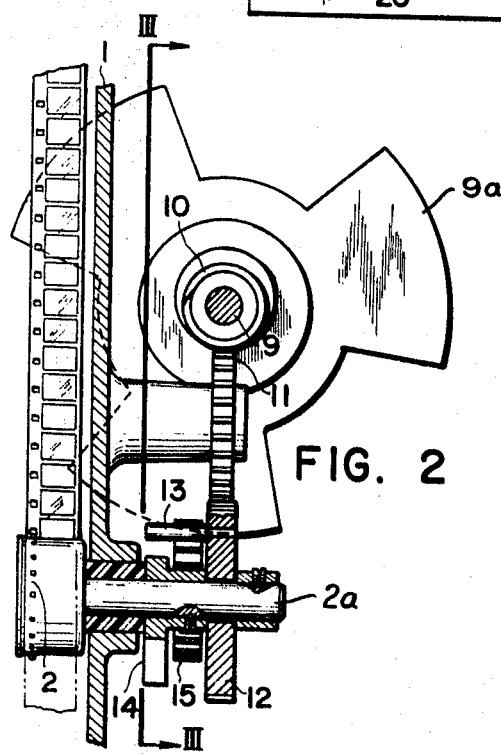
FIG. 2
FIG. 3
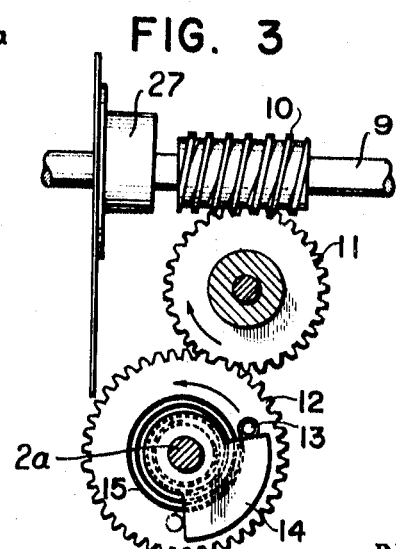
INVENTOR
TOKUSABURO KAKIUCHI
BY Burgess, Ryan + Hicks
ATTORNEY

AUTOMATIC FILM LOOP FORMING DEVICE FOR USE IN MINIATURE MOVIE PROJECTOR

BACKGROUND OF THE INVENTION

The present invention relates to a miniature movie projector and more particularly an automatic film loop forming device for use in a miniature movie projector.

In case of transporting intermittently the film by means of the pulldown claw in a movie projector, it is standard practice to provide loops of the film above and below the projection aperture or gate in order to prevent excess load from the side of the film supply magazine or reel from being applied to the pulldown claw and also in order to ensure that the film remains stationary for a predetermined time at the projection apertures or gate of the projector in the course of the intermittent movement of the film. However, in some cases, for example, as in the case of an 8 mm. movie camera in which the initial load of the film supply magazine or reel is relatively small and in which the pitch between the perforations of the film is short, it is not necessary to form a loop of film above the projection aperture or gate as shown in FIG. 1 of the accompanying drawing. But it is required without exception to provide a loop of the film below the projection aperture or gate (that is, on the side where the film is taken up) because of the reasons described above. In order to ensure the engagement of the perforations of the film with the teeth of the sprocket for transporting the film disposed below the aforementioned loop of the film formed below the projection aperture or gate, it is required to provide a pair of pressure rollers. These comprise a fixed and a movable roller located between the sprocket and said lower film loop so that the film being transported may be interposed between said pair of pressure rollers at a fixed position. Furthermore, it is required to provide a guide roller below the sprocket so that a predetermined length of the film may be positively lapped around the periphery of the sprocket.

Because of the need to thread the film as described above, it is a painstaking task to load a movie film upon the projector. Furthermore, every component of the miniature movie projector must be made small in size, and all are assembled within a limited space. The space available between the lower end of the film pressure plate and the aforementioned sprocket is very much limited so that it is very complicated and awkward to form a loop of the film by inserting the finger tip in this space. Moreover, when a well-known film passage opening and closing type automatic loop forming device is incorporated in the conventional "automatic film loading" projector, the arrangement and disposition of the mechanical components are very complicated and the cost is high.

The present invention contemplates overcoming the above-described problems by providing a simple device for automatically forming a loop of the film on the side of the film takeup magazine or reel by an operation interlocked with the starting operation of the projector.

SUMMARY OF THE INVENTION

According to the present invention, the film transporting sprocket disposed below the projection aperture or gate of the projector remains momentarily stationary as the shutter starts its rotation and the film is started to be pulled down by the pulldown claw, and is then started a predetermined time after the actuation of the aforementioned shutter and the pulldown claw, so that the film loop is automatically formed between the lower end of the projection aperture or gate of the projector and the sprocket. According to the present invention, the following mechanism is utilized in order to retard the rotation of the sprocket later than the start of the rotation of the shutter. A worm is securely carried by the shaft of the shutter, and this worm is adapted to drive a helical gear loosely carried by the driving shaft of the sprocket through another helical gear carried by an intermediate shaft. A segment is fixedly carried by the driving shaft of the sprocket. A hair spring extends between the aforementioned driving shaft and a pin disposed on one side of the helical gear carried loosely thereby in such a manner that the spring biases this helical gear normally in the direction of rotation opposite to that of the driving shaft of the sprocket. Therefore, the pin abuts against one radial peripheral side of the segment when the projector is not operated. When the shutter starts to rotate and the pulldown claw starts to pull down the film, both the sprocket and the segment remain stationary for some time because during this period the pin rotates in the path in which the segment is not disposed so that the sprocket shaft is not driven until the pin abuts against the other radial peripheral side of the segment. The film pulled down during this time forms a loop between the lower end of the projection aperture or gate of the projector and the sprocket disposed below the aperture or gate.

Therefore, one of the objects of the present invention is to provide a miniature movie projector in which a loop of the film is automatically formed by a simple mechanism.

Another object of the present invention is to provide a miniature projector easy to operate.

These and other objects and advantages of the present invention will become apparent from the following description when read in the light of the accompanying drawings.

BRIEF DESCRIPTION OF DRAWINGS

FIG. 1 is a side view of one preferred embodiment of a miniature movie projector according to the present invention;

FIG. 2 is an enlarged view illustrating the essential part of an automatic film loop forming device according to the present invention, looking at the right side of the longitudinal sectional view taken along the plane II—II containing the shaft of a film winding sprocket of FIG. 1; and FIG. 3 is a sectional view taken along the line III—III of FIG. 2.

DESCRIPTION OF PREFERRED EMBODIMENT

Now referring especially FIG. 1, reference numeral 1 designates a main casing member of a projector main body; 2, a sprocket for winding the film; 3, a roller disposed at a fixed position; 4, a movable roller adapted to press against the roller 3; 5, a guide roller for guiding the film; and 6, a film pressure plate.

Upon one sidewall frame member of the main case 1 is mounted a projection lens 7, and immediately behind (to the right in the FIG.) the projection lens 7 is fixedly secured in position on the side frame member of the main case 1 a lighttight box 8 having a projection aperture or gate at the front side surface thereof, the lighttight box being disposed in such a manner that its opening is directed into the interior (the back side of the paper in the FIG.) of the main case 1. As shown in FIG. 2, a shutter shaft 9 is disposed within the main casing 1 so as to be in parallel with the optical axis of the projection lens 7, and is adapted to be driven by a motor (not shown). A shutter in the form of a sector disc 9a having a plurality of blades each in the form of a segment is carried by the shaft 9 in such a manner that these blades may extend beyond the sidewall frame of the main case 1 while rotating across the projection aperture or gate of the lighttight box 8. At a suitable position within the main case 1 is disposed a projection or illumination lamp source in such a manner that its light is reflected by a reflecting mirror obliquely disposed within the lighttight box 8 so as to illuminate the movie film being transported between the projection lens 7 and the lighttight box 8.

As shown in FIG. 1, below the lighttight box 8 is disposed a sprocket 2 for winding or transporting the film, and the shaft 2a of this sprocket is extending into the interior of the main body of the projector as shown in FIG. 2. A worm 10 fixedly carried by the shutter shaft 9 is in mesh with a helical gear 11 (which must be a worm gear in the strict engineering viewpoint, but a helical gear may be used in practice without causing any inconvenience) carried by a suitable intermediate shaft. This helical gear 11 is further in mesh with another helical gear 12 carried loosely by the shaft of the sprocket wheel.

A pin 13 extending from one side surface of the helical gear 12 is extended to be located in the path of rotation of the edge of a segmental plate 14 whose center of rotation is fixedly secured to the shaft of the sprocket wheel. A hair spring 15 whose inner end is fixedly secured to the shaft of the sprocket wheel has its outer end fixed securely to the pin 13.

As shown in FIG. 1, between the lower end of the lighttight box 8 (that is the lower edge portion of the pressure plate 6) and the rotating periphery of the sprocket wheel 2 there is attached to the side frame member of the main body of the projector the shaft of the roller 3. A pivot 18 of a bellcrank 17, whose one arm carries the roller 4 which is adapted to contact with or moved away from the roller 3, is also fixed to the sidewall of the main body of the projector. In a similar manner, a pivot 20 of a bellcrank 19 whose one arm carries a tension guide roller 5 is fixed to the sidewall of the main body of the projector. The tension guide roller 5 is adapted to lap around the sprocket wheel 2 a suitable length of the film. The other arms of the aforementioned bellcranks 17 and 19 are operatively interconnected with each other by means of connecting levers 21 and 21a respectively. These two bellcranks 17 and 19 are biased so as to rotate in the clockwise direction about the pivots 18 and 20 respectively by means of a spring 21b. In the embodiment shown in FIG. 1, the projector is adapted to project the film which is loaded in a cartridge 24 having a supply reel 22 and a takeup reel 23 therein. When this cartridge 24 is attached to the side frame of the main body of the projector, the straight film portion exposed outwardly of the cartridge between guide rollers 25 and 26 is so arranged and disposed that the film may pass the film track of the projector, the guide roller 3, and the sprocket wheel 2.

During the loading operation the movable rollers 4 and 5 are first manually displaced toward the left in the FIG. 1 against their tendency to move toward the right. The cartridge is then placed in its predetermined position, and thereafter these movable rollers 4 and 5 are released. Therefore, the film is gripped between the fixed and movable rollers 3 and 4 under a suitable pressure, and at the same time, the tension guide roller 5 pushes toward the rear of the camera the film segment which extends between the sprocket 2 and the lower guide roller 26 of the cartridge 24 so that a predetermined length of the film is lapped around the periphery of the sprocket 2. In this condition, the film segment located between the lower end of the film pressure plate 6 and a pair of pressure rollers 3 and 4 is still maintained straight.

Next, when the projector is started, the shutter shaft is rotated so that a cam 27 carried by the shutter shaft actuates a pulldown claw 28, thus pulling down the film. This conventional intermittent film advance mechanism is shown, for example, in U.S. Pat. No. 3,134,294 to Kaden et al. The worm 10 carried by the shutter shaft then rotates the loosely carried gear 12 upon the sprocket shaft through the intermediate toothed wheel 11 in the direction indicated by the arrow. In this case, as best shown in FIG. 3, the pin 13 carried by the toothed wheel 12 rotates along the path in which is not disposed the segment 14 so that no power is transmitted to the segment 14. Since the film whose perforations are engaged with the teeth of the sprocket is held securely by means of the frictional force between the pair of rollers 3 and 4 disposed above the sprocket the segment 14 carried on shaft 2a is not permitted to rotate. The toothed wheel 12 rotates so as to wind up the hair spring 15. During this period, a loop of the film is formed above the pair of rollers 3 and 4. When the pin 13 comes in contact with the one radial side edge of the segment 14, then the segment is caused to rotate in the direction indicated by the arrow in FIG. 3 against the frictional force produced between the pair of rollers 3 and 4 and the film interposed therebetween, so that the sprocket 2 starts to wind or rotate the film as in the case of the conventional projector. Upon completion of the projection of one film cartridge, as shown in FIG. 1 both of the bellcranks 17 and 19 are rotated manually about their pivots respectively in the counterclockwise direction so that the movable rollers 4 and 5 are moved toward the left in FIG. 1, whereby the film wound around the takeup reel is rewound around the supply reel of the cartridge. When the engagement of the perforations of the film with the teeth of the sprocket 2 is released, then the sprocket is permitted to rotate freely so that the wound spring 15 is sprung back by its elasticity thereby reversing the direction of the rotation of the segment 14, whereby the relative position of the toothed wheel having the pin 13 with respect to the segment 14 is restored to its initial position as indicated in FIG. 3.

The embodiment has been described as the projector of the type to which is loaded the cartridge having the film loaded therein, but it should be noted here that the function of the present invention to automatically form a loop of the film as soon as the projector is actuated has nothing to do directly or indirectly with the fact that the film to be projected is loaded in the cartridge. Therefore, it will be clearly understood the principle of the present invention can be also applied to a projector of the type in which the film is transported from the supply or feed magazine or reel to the takeup magazine or reel, both of the magazines or reels being rotatably carried by the main body of the projector. However, the present invention is particularly advantageous when applied to the above-described cartridge-type projector because when the cartridge is attached or loaded into the projector, then the exposed straight film portion is located as shown in FIG. 1 at a predetermined preferred position, whereby the loading and unloading of the film of the projector can be much facilitated.

According to the present invention, the operation of the film loading and unloading can be advantageously simplified because the present invention provides only a start-retarding device for a sprocket whose construction is simple as shown in FIG. 2 so that a loop of the film can be automatically formed at a suitable portion thereof at the beginning of the operation of the projector, and the projections can be continuously made without any interruption, thus eliminating the cumbersome manual operation of the finger tip which is inserted into the narrow space portions of the projector so as to form a loop of the film, or an automatic loop forming device whose construction is very much complicated.

The present invention has been described in detail with particular reference to a preferred embodiment thereof but it will be understood that variations and modifications can be effected within the spirit and scope of the present invention as described hereinabove and as defined in the appended claims.

I claim:

1. An automatic film loop forming device for use in a movie projector having means defining a film path past a projection aperture to a film storage means, drive means for driving, when activated, a shutter, and a rotatable sprocket in the film path between the projection aperture and the film storage means, said device comprising:
   a pair of rollers movable toward and away from each other and biased into contact by a spring for gripping the film therebetween, said rollers being disposed between the sprocket and the projection aperture of the film path;
   a segment mounted on the shaft of the sprocket and rotatable therewith;
   a rotatable gear positioned coaxially of said sprocket;
   a pin extending from one side of said rotatable gear into the path of rotation of the segment;
   a hair spring whose one end is connected to the sprocket for rotation therewith and whose other end is connected to the rotatable gear for rotation therewith; and
   means for operatively coupling the rotatable gear to the shutter for rotation upon movement of the shutter.

2. An automatic film loop forming device for use in a movie camera or projector, said camera or projector having means defining a film path extending from a first film storage means to a second film storage means past the optical axis of a lens, drive means for driving, when activated, a shutter in the optical axis, first advancing means in the film path at a first position for engaging and steadily advancing, when activated, a film along the film path from the optical axis toward the second film storage mans at a given advance rate, and second advancing means in the film path at a second position between the first storage means and the first position for intermittently advancing the film, when activated, at a rate equal, on the average, to the given advance rate, the improvement comprising:
- a drive train between the shutter, the first advancing means, and the second advancing means; and
- lost motion mechanism in the drive train between the first advancing means and the rest of the drive train, said lost motion mechanism delaying the activation of the first advancing means until the second advancing means has advanced a predetermined amount of film, whereby a loop is formed in the film between the first and second advancing means.

3. The device of claim 2 wherein:

the first advancing means comprises a rotatable sprocket;

the drive train comprises a rotatable first member connected to the sprocket for rotation therewith, a rotatable second member connected for rotation in synchronism with the second advancing means, said first and second members being coaxially positioned and rotatable relative to each other between a loading position and driving position, rotation of the second member relative to the first member tending to move the first and second members into the driving position; and resilient means biasing the first and second members into the loading position.

4. The device of claim 3 comprising drag means for contacting a film in the film path at a position between the first position and the second position and exerting a drag thereon, thereby tensioning the film at the sprocket.

5. The device of claim 4 wherein the drag means comprises a pair of drag rollers rotatable about drag roller axes, said drag rollers being movable between a loading position and a closed position, said drag rollers when in the loading position being separated by a gap greater in width than the film thickness and when in the closed position being positioned to contact opposite sides of a film in the film path and to exert a pinching force thereon; and resilient means urging the drag rollers into the closed position.

6. An automatic film loop forming device for use in a movie camera or projector, said camera or projector having means defining a film path extending from a first film storage means to a second film storage means past the optical axis of a lens, a rotary shutter mounted upon and rotatable with a shutter shaft, and a pulldown mechanism operable in response to rotation of the shutter for contacting a film in the film path at a pulldown position and intermittently advancing said film past the optical axis, said device comprising:

- a sprocket in the film path mounted upon and rotatable with a sprocket shaft, said sprocket being positioned at a sprocket position between the pulldown position and the second film storage means;
- drag means for contacting a film in the film path at a drag position between the pulldown position and the sprocket position and exerting a drag on said film at said drag position;
- a first lost motion member rotatable in synchronism with the shutter shaft about a lost motion axis;
- a second lost motion member rotatable in synchronism with the sprocket shaft about the lost motion axis and rotatable relative to the first lost motion member between a loading position and a driving position;
- a first abutment member on the first lost motion member rotatable therewith;
- a second abutment member on the second lost motion member rotatable therewith;
- the first abutment member contacting the second abutment member when the lost motion members are in the driving position and thereby connecting said lost motion members for rotation together; and
- resilient means extending between the lost motion members and biasing said members into the loading position, said resilient means lacking sufficient force to overcome the drag exerted on a film in the film path by the drag means and thereby rotate the sprocket when said sprocket is engaged with and advancing said film, but having sufficient force to rotate the lost motion members into the loading position when the sprocket is disengaged from a film.

7. The device of claim 6 wherein the first abutment member contacts the second abutment member when the lost motion members are in the loading position and prevents relative rotation of the lost motion members past the loading position.

8. The device of claim 6 wherein the resilient means comprise a spiral hair spring extending between the lost motion members.

9. The device of claim 8 wherein:

the first lost motion member comprises a gear mounted coaxially of the sprocket shaft and rotatable relative thereto;

the second lost motion member comprises a segment fixedly mounted on the sprocket shaft;

said device comprising:

means for rotating the gear in synchronism with the shutter shaft; and a pin extending from the gear past the segment and positioned to contact one side of the segment when the gear and segment are in a loading position and to move about and contact the other side of the segment when rotated relative to the segment by rotation of the shutter shaft, thereby putting the gear and segment into a driving position.